(12) United States Patent
Verplancke

(10) Patent No.: US 11,192,049 B2
(45) Date of Patent: Dec. 7, 2021

(54) METHOD AND DEVICE FOR OBTAINING WATER FROM AMBIENT AIR

(71) Applicant: AQUAHARA TECHNOLOGY GMBH, Gilching (DE)

(72) Inventor: Philippe Verplancke, Gilching (DE)

(73) Assignee: AQUAHARA TECHNOLOGY GMBH, Gilching (DE)

( * ) Notice: Subject to any disclaimer, the term of this patent is extended or adjusted under 35 U.S.C. 154(b) by 291 days.

(21) Appl. No.: 16/302,586

(22) PCT Filed: May 16, 2017

(86) PCT No.: PCT/EP2017/061725
§ 371 (c)(1),
(2) Date: Nov. 16, 2018

(87) PCT Pub. No.: WO2017/198664
PCT Pub. Date: Nov. 23, 2017

(65) Prior Publication Data
US 2019/0299123 A1    Oct. 3, 2019

(30) Foreign Application Priority Data

May 17, 2016  (DE) .................... 10 2016 006 027.1
Jul. 29, 2016  (DE) .................... 10 2016 009 276.9

(51) Int. Cl.
*B01D 53/26* (2006.01)
*B01D 5/00* (2006.01)
(Continued)

(52) U.S. Cl.
CPC ......... *B01D 5/0027* (2013.01); *B01D 5/0087* (2013.01); *B01D 53/263* (2013.01);
(Continued)

(58) Field of Classification Search
CPC ............ B01D 2252/10; B01D 2259/65; B01D 53/263; B01D 5/0027; B01D 5/0087;
(Continued)

(56) References Cited

U.S. PATENT DOCUMENTS

2016/0237659 A1*  8/2016  Thielow ............... B01D 53/263

FOREIGN PATENT DOCUMENTS

| CL | 2009-02126 | 6/2011 |
| CL | 2013-01393 | 4/2013 |

(Continued)

OTHER PUBLICATIONS

International Preliminary Report on Patentability issued in PCT Application No. PCT/EP2017/061725, dated Nov. 29, 2018.
(Continued)

*Primary Examiner* — Cabrena Holecek
(74) *Attorney, Agent, or Firm* — Medler Ferro Woodhouse & Mills PLLC

(57) ABSTRACT

A method for obtaining water from ambient air is disclosed that includes bringing the ambient air into contact with at least one liquid absorption agent for absorbing at least one part of the water contained in the ambient air, conveying an absorption agent diluted by the absorbed water to a first heat exchanger, and transferring the diluted absorption agent in at least one desorption device. Water desorbed in the desorption device is transported to the first heat exchanger, the desorbed water being cooled by means of the diluted absorption agent by means of the first heat exchanger. A device for obtaining water from ambient air is also disclosed.

14 Claims, 1 Drawing Sheet

(51) Int. Cl.
*C02F 1/14* (2006.01)
*E03B 3/28* (2006.01)

(52) U.S. Cl.
CPC .............. *C02F 1/14* (2013.01); *E03B 3/28* (2013.01); *B01D 2252/10* (2013.01); *B01D 2259/65* (2013.01); *Y02A 20/00* (2018.01); *Y02A 20/212* (2018.01)

(58) Field of Classification Search
CPC .. C02F 1/14; E03B 3/28; Y02A 20/00; Y02A 20/212
See application file for complete search history.

(56) References Cited

FOREIGN PATENT DOCUMENTS

| | | |
|---|---|---|
| DE | 10 2008 023 566 A1 | 11/2009 |
| DE | 10 2013 013 214 A1 | 2/2015 |
| WO | 2005/072850 A1 | 8/2005 |
| WO | 2009/096809 | 8/2009 |
| WO | 2012/162545 | 11/2012 |

OTHER PUBLICATIONS

First Office Action dated Dec. 17, 2019 in corresponding Chilean Patent Application No. 2018-003225.
International Search Report dated Nov. 3, 2017 in corresponding International Patent Application No. PCT/EP2017/061725.

\* cited by examiner

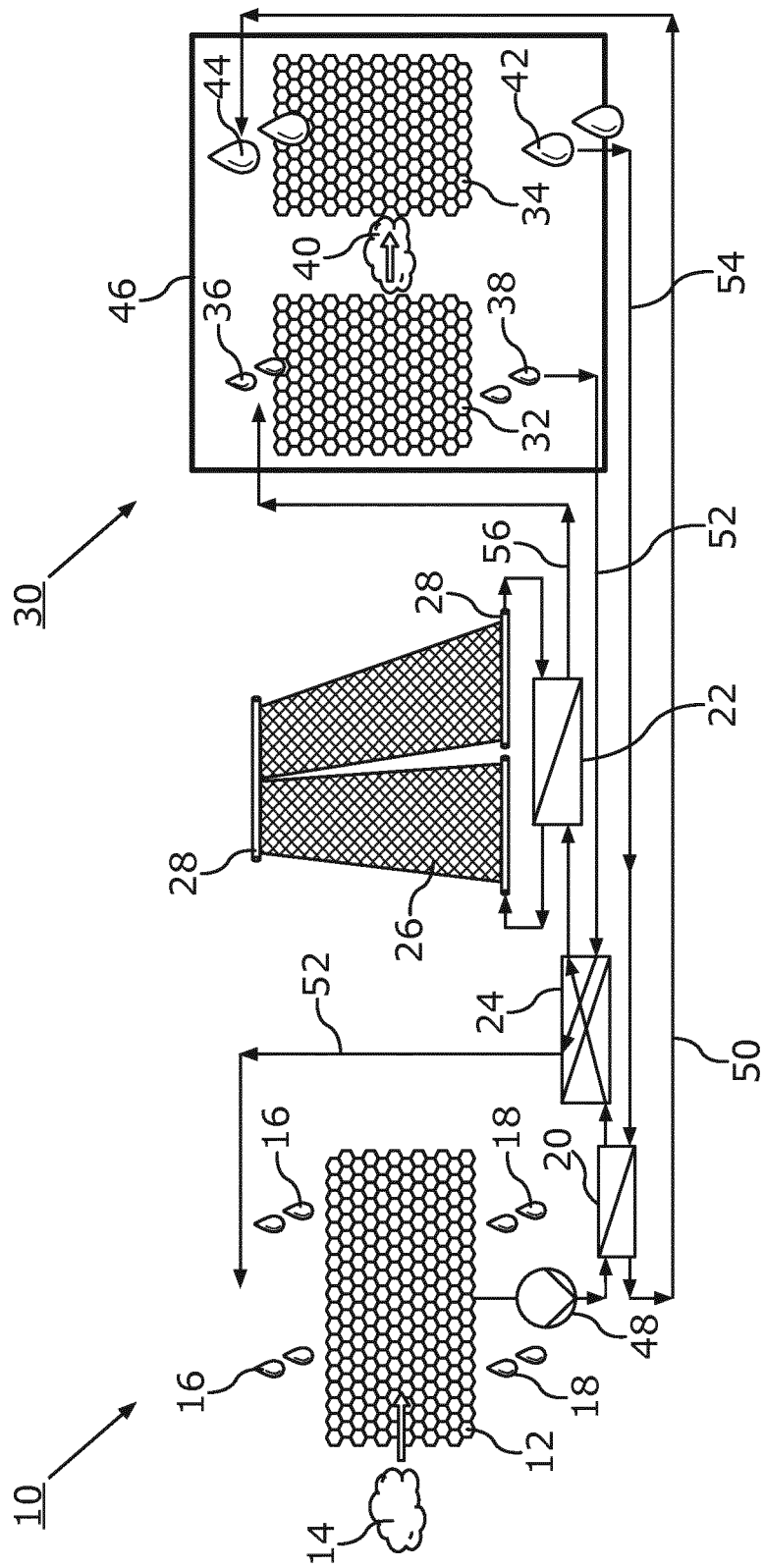

METHOD AND DEVICE FOR OBTAINING WATER FROM AMBIENT AIR

The present invention relates to a method for obtaining water from ambient air, wherein the method includes at least the following method steps: bringing the ambient air into contact with at least one liquid absorption agent for absorbing at least a part of the water contained in the ambient air; conveying an absorption agent diluted by the absorbed water to a first heat exchanger and transferring the diluted absorption agent into at least one desorption device. The invention further relates to a device for obtaining water from ambient air including at least one device for applying and/or conducting a liquid absorption agent onto and/or to a first absorption structure, wherein the first absorption structure is formed for absorbing at least a part of the water contained in the ambient air; at least one conveying device for conveying an absorption agent diluted by the absorbed water to a first heat exchanger and at least one desorption device.

Such methods and devices for obtaining water from ambient air are known in a great plurality. In particular, corresponding absorption methods are known from the air dehumidification technology. Therein, humidity is absorbed from the air in so-called liquid drying agents, for example in concentrated, hygroscopic salines. A highly hygroscopic salt is e.g. lithium chloride. Subsequently, the water is again partially removed from the saline by heating, vacuum distillation, reverse osmosis or similar methods such that the solution can again be employed for dehumidifying the air. This method is for example industrially offered by the company Kathabar (see http://www.kathabar.com/liquid-desiccant/system-features-benefits). Further systems, which are offered on the market under the designation "Ducool" (see http://icogen-sa.com/deshumidificadores-ener-g,.-du-cool-separator/caracter%C3% ADsticas-de-la-serie-du-han-dling.html), conduct process air through a honeycombed structure, which is soaked with the saline, by means of a blower such that water vapor is there absorbed from the air by the cool and concentrated saline. A separate regeneration airflow is sent through the honeycomb structure soaked with the warm saline. Therein, a part of the water again evaporates from the saline and the water vapor is discharged from the regeneration air. The methods presented above can be used for the construction of an atmospheric water generator, wherein the objective of these methods is the air dehumidification and not obtainment of liquid water from the ambient air. From WO 2009/135618 A1, a method and a corresponding device for obtaining water from the ambient air having the features of the preambles of the respective independent claims are known.

All of the above mentioned methods and devices disadvantageously have a very high energy input, in particular of electrical energy. If one would supply the known atmospheric water generators exclusively with regenerative energy, for example in desert regions, this would imply the requirement of a very large area of photovoltaic modules with correspondingly high cost per liter of the obtained water. Heretofore, heat from the following sources is therefore employed for the operation of the known plants with evaporation devices: combustion of fossil fuels, with the known disadvantages for the environment; conventional thermal solar modules, often even with vacuum tubes, to be able to reach correspondingly high temperatures and with correspondingly high plant cost; as well as condensation heat in the method of the so-called exhaust vapor compression, for which much electrical energy is again required.

The heat arising in the condensation of the water subsequent to the evaporation/distillation of the saline has to be dissipated to the environment. Thereto, heat exchangers, typically gas/gas heat exchangers, for example plate heat exchangers (cross-flow or counterflow heat exchangers), or also cooling devices are employed in conventional plants, which in turn increase the plant cost.

Therefore, it is the object of the present invention to provide a generic method and a generic device, which can be simpler and more inexpensively operated and manufactured, respectively, and require less energy input than known methods and devices.

A generic method according to the features of claim 1 as well as a device according to the features of claim 16 serve for solving these objects. Advantageous configurations with convenient developments of the invention are specified in the respective dependent claims, wherein advantageous configurations of the method are to be regarded as advantageous configurations of the device and vice versa.

A method according to the invention for obtaining water from ambient air includes at least the following method steps: bringing the ambient air into contact with at least one liquid absorption agent for absorbing at least a part of the water contained in the ambient air; conveying an absorption agent diluted by the absorbed water to a first heat exchanger; transferring the diluted absorption agent into at least one desorption device, wherein water desorbed in the desorption device is conveyed to the first heat exchanger and cooling of the desorbed water is effected by means of the diluted absorption agent by means of the first heat exchanger. First, cooling of the desorbed water as well as the desorption device via discharge of the heated desorbed water as well as optionally the return of at least a part of the cooled desorbed water into the desorption device is possible and ensured, respectively, by the method according to the invention. In addition, heating of the diluted absorption agent before transfer of the diluted absorption agent into the desorption device is effected in the first heat exchanger. Therefore, separate cooling devices can advantageously be omitted. Thereby, the method can be simply and inexpensively operated and requires lower energy input than known methods. Therein, any type of liquid drying agents is understood by the term "liquid absorption agent", which result in absorption of at least a part of the water contained in the ambient air in the absorption agent. The liquid absorption agents can in particular be salines such as for example a lithium chloride solution. Actively conveying for example by means of at least one pump, but also conveying by means of gravity is understood by the term "conveying".

In further advantageous configurations of the method according to the invention, bringing the ambient air into contact with the liquid absorption agent is effected by spraying the absorption agent in the ambient air or by means of passing the ambient air through an absorption structure soaked with the absorption agent. Thereby, it is ensured that the ambient air is brought into contact with the liquid absorption agent in large-surface manner. For the case of the use of an absorption structure soaked with the absorption agent, honeycomb structures or also other large-surface structures are used, over which the absorption agent can flow and through which and/or around which the ambient air flows. Other structures are also conceivable, wherein it is to be taken care that the ambient air is always brought into contact with the liquid absorption agent in large-surface manner. By the mentioned method steps, absorption of the water contained in the ambient air as large as possible is ensured.

In further advantageous configurations of the method according to the invention, additional heating of the absorption agent diluted by the absorbed water is effected by means of at least one heating device, wherein the heating device(s) is/are arranged before and/or after and/or outside of and/or within the desorption device. The heating of the diluted absorption agent increases the efficiency of the desorption of the absorbed water within the desorption device. Thereby, the amounts of water obtained from the ambient air can be significantly increased. Therein, the heating devices can be arranged before and thereby outside of the desorption device and/or also within the desorption device in flow direction of the diluted absorption agent. Therein, there is the possibility that the heating device includes at least one second heat exchanger arranged between the first heat exchanger and the desorption device. This second heat exchanger is connected to a heat source on the one hand and to the lines or hoses conducting the diluted absorption agent on the other hand. In particular, the second heat exchanger can be in operative connection to at least one solar module and/or at least one hose system with a heat transfer liquid. In particular, the mentioned heat exchangers, solar modules and/or line systems for heat transfer liquids can be used as the heating devices in the method according to the invention. The use of the mentioned heating devices ensures an overall low energy input and thereby an inexpensive method by the use of in particular regenerative energies. The possibility of the arrangement of at least one heating device in the desorption device also results in considerably increased yield of water.

In further advantageous configurations of the method according to the invention, a heated and diluted absorption agent is supplied to at least one evaporation structure in the desorption device, wherein evaporation of at least a part of the water contained in the heated, diluted absorption agent is effected at and/or in the evaporation structure. The evaporation structure in turn is formed such that large-surface evaporation of the water contained in the heated, diluted absorption agent occurs. For example, honeycomb structures can also be used for the evaporation structure. Since the evaporation structure is formed with a large surface, the evaporation of the water contained in the diluted and heated absorption agent can be effected at relatively low temperatures. Therefore, the already described heating of the water of the ambient air absorbed in the first absorption structure can be effected by means of relatively inexpensive thermal solar modules or the other heating devices described above. Expensive high-temperature solar modules or other cost-intensive assemblies for improving the evaporation rate at the evaporation structure can advantageously be omitted. Furthermore, the water evaporated by means of the evaporation structure can be supplied to at least one condensation structure soaked with water for condensation of the water vapor. The supply of the evaporated water to the condensation structure can be effected by means of natural and/or technically generated airflow. However, there is also the possibility that the supply of the evaporated water to the condensation structure is effected by means of natural diffusion. Furthermore, there is the possibility that a negative pressure for assisting the supply of the evaporated water to the condensation structure is applied within the desorption device. By these measures, it is ensured that the water evaporated at the evaporation structure is readily supplied to the condensation structure in particular without great energy expenditure. With a naturally generated airflow, additional energy is not required. But also with a technically generated airflow, as it can for example be generated by a blower, the additional energy expenditure is low. The same applies to the application of a negative pressure within the desorption device. By these measures, it is ensured according to the invention that at least a large part of the evaporated water can be condensed at the condensation structure and can be discharged from the desorption device as liquid water. The condensation structure in turn has a surface as large as possible, as it is for example satisfied by a honeycomb structure. But other structures are also conceivable.

In further advantageous configurations of the method according to the invention, the condensation structure is at least partially soaked with desorbed water cooled by the first heat exchanger. This increases the condensation rate of the water vapor on the condensation structure. Furthermore, there is the possibility that a concentration of the diluted absorption agent is effected at the evaporation structure while obtaining a concentrated absorption agent, wherein the concentrated absorption agent is supplied to the absorption structure with or without interposition of a third heat exchanger. If the third heat exchanger is arranged and used after the first heat exchanger in flow direction of the diluted absorption agent, thus, heating of the diluted absorption agent is effected by it before entry into the desorption device. By the use of this already present heat source, the requirement of external heat sources is again avoided or at least reduced such that the method can be extremely inexpensively and energy-efficiently operated.

In a further advantageous configuration of the method according to the invention, at least a part of the desorbed water is removed from the system circuit via at least one suitable device before and/or after the first heat exchanger in flow direction. Thereby, it is avoided on the one hand that the amount of water continuously increases in the system by the continuous condensation of water in the desorption device. In order that the water circuit does not overflow, at least a part of this desorbed water is removed continuously or at predetermined points of time.

Furthermore, the present invention relates to a device for obtaining water from ambient air, wherein the device includes at least one device for applying and/or conducting a liquid absorption agent onto and/or to an absorption structure, wherein the absorption structure is formed for absorbing at least a part of the water contained in the ambient air. In addition, the device includes at least one conveying device for conveying an absorption agent diluted by the absorbed water to a first heat exchanger and at least one desorption device. According to the invention, the first heat exchanger is connected to the desorption device in liquid conducting manner such that water desorbed in the desorption device is cooled by means of the diluted absorption agent. By the configuration of the device according to the invention, inexpensive cooling of the water desorbed in the desorption device and thereby of the desorption device by itself is effected. Additional cooling devices for example at or in the desorption device can be omitted according to the invention. Thereby, the device according to the invention can be inexpensively and simply manufactured on the one hand and additionally a lower energy input is required. As already set forth, the term "liquid absorption agent" is used for all of the types of liquid drying agents, which can serve for absorbing at least a part of the water contained in the ambient air. Therein, the liquid absorption agent can for example be a hygroscopic saline. Actively conveying for example by means of at least one pump, but also conveying by means of gravity is understood by the term "conveying".

In further advantageous configurations of the device according to the invention, the device includes at least one heating device for heating the diluted absorption agent, wherein the heating device(s) is/are arranged before and/or after and/or outside of and/or within the desorption device. By the additional heating of the diluted absorption agent, which is advantageously already heated by the first heat exchanger, the desorption of the water within the diluted absorption agent is facilitated and accelerated. Thereby, considerable increase of the portions of water obtained from the ambient air results according to the invention. Therein, the heating devices can in particular include heat exchangers, solar modules and/or line systems for heat transfer liquids. In particular, these types of heating devices can be energy-efficiently operated. For example, there is the possibility that the heating device includes at least one second heat exchanger arranged between the first heat exchanger and the desorption device, wherein the second heat exchanger is connected to the first heat exchanger in liquid conducting manner on the one hand and to the desorption device in liquid conducting manner on the other hand. Therein, the second heat exchanger can in particular be in operative connection to at least one heating device such as for example at least one solar module and/or at least one hose system with a heat transfer liquid.

In a further advantageous configuration of the device according to the invention, at least one evaporation structure is formed in the desorption device, wherein at least a part of the water of a heated and diluted absorption agent supplied to the desorption device evaporates at and/or in the evaporation structure. A reliable desorption of the water bound in the heated and diluted absorption agent is ensured by the evaporation structure. Furthermore, there is the possibility that at least one condensation structure soaked with water for condensation of the water evaporated by means of the evaporation structure is formed in the desorption device. Therein, the desorption device can additionally include means for transporting the water evaporated by means of the evaporation structure to the condensation structure. Such means for transport can for example be realized by a blower within the desorption device. However, there is also the possibility that the device includes means for generating a negative pressure in the desorption device. By the mentioned possibilities of configuration of the desorption device, desorption of the water bound in the heated and diluted absorption agent via evaporation on the one hand and additionally the condensation of the water vapor thus obtained on the condensation structure is ensured. Thereby, reliable obtainment of water from the ambient air is ensured. By the arrangement of at least one heating device within the desorption device for further heating the supplied, heated and diluted absorption agent, the desorption thereof and thereby an evaporation rate of the bound water on the evaporation structure is also significantly increased. The means for transporting the water vapor from the evaporation structure to the condensation structure, but also the means for generating a negative pressure in the desorption device accelerate the supply of the water vapor to the condensation structure. Therein, both the evaporation structure and the condensation structure are formed such that they form a large surface. Herein, honeycomb structures can in particular be used. But other structures are also conceivable. The formation of large surfaces increases the yield of water vapor and water, respectively, both at the evaporation structure and the condensation structure. In addition, it is ensured that the mentioned procedures can be efficiently performed at relatively low temperatures.

In a further advantageous configuration of the device according to the invention, it includes at least one line system, wherein the line system is formed such that the condensation structure is at least partially soaked with desorbed water cooled by the first heat exchanger. By the at least partial return of the desorbed water from the ambient air, additional water sources can be omitted. Thereby, cost-efficient obtainment of the water from the ambient air is ensured.

In further advantageous configurations of the device according to the invention, it comprises at least one line system, wherein this line system is formed such that concentrated absorption agent flowing off from the desorption device is supplied to the first absorption structure with or without interposition of a third heat exchanger. Advantageously, the flow circuit of the absorption agent can also be closed by the mentioned line system such that it can be frequently reused. Thereby, considerable cost savings arise. In case the third heat exchanger is interposed, it is arranged after the first heat exchanger in flow direction of the diluted absorption agent, wherein heating of the diluted absorption agent is effected by the third heat exchanger before entry into the desorption device. Thereby, the heat of the concentrated absorption agent flowing off from the desorption device can be used for additionally heating the diluted absorption agent. Thus, the device can be extremely energy-efficiently operated.

In a further advantageous configuration of the device according to the invention, the device includes at least one device for removing the desorbed water from the system circuit. Therein, this removal device can be arranged before and/or after the first heat exchanger. By the at least partial removal of the desorbed water, it is ensured on the one hand that the water circuit in the device does not overflow, the removed water can be used for other purposes on the other hand. Therein, the removal of the desorbed water can be effected continuously or at preset points of time.

Further features of the invention are apparent from the claims, the embodiment as well as based on the drawing. The features and feature combinations mentioned above in the description as well as the features and feature combinations mentioned below in the embodiments are usable not only in the respectively specified combination, but also in other combinations without departing from the scope of the invention.

Therein, the FIGURE shows a schematic representation of a device according to the invention.

The device 10 for obtaining water from ambient air 14 includes a device (not illustrated) for spreading a liquid absorption agent 16 to an absorption structure 12 in the illustrated embodiment. For spreading or applying the liquid absorption agent 16, a suitable pipe system with corresponding openings or valves or comparable spraying devices can be used. Therein, the liquid absorption agent 16 is in particular distributed over an entire upper surface of the absorption structure 12 and thus soaks the absorption structure 12. Subsequently, the absorption agent 16 slowly flows into the lower areas of the absorption structure 12, where it again flows out of it and is again collected by a suitable tub system (not illustrated). One recognizes that the absorption structure 12 is honeycombed formed in the illustrated embodiment. Thereby, a very large surface arises, on which an absorption of at least a part of the water contained in the ambient air 14 can be effected. Therein, the absorption of the water from the ambient air 14 is effected in the liquid absorption agent 16, wherein the condensation heat arising thereby is immediately again released to the ambient air 14 from the absorption agent 16 by the large surface of the honeycombed absorption structure 12. By the absorption of water from the ambient air 14, the liquid absorption agent 16 is diluted and exits the absorption structure 12 as a diluted absorption agent 18.

In the illustrated embodiment, the ambient air 14 is brought into contact with the liquid absorption agent 16 in large-surface manner. The liquid absorption agent 16 is for example a concentrated lithium chloride solution. Therein, the absorption structure 12 can be formed such that it can be set up outdoors and can be passed by natural wind. Thereby, energy and plant cost can be saved since additional blowers are not required. However, if the natural wind conditions should not allow sufficiently large passage of the ambient air 14 through the absorption structure 12, corresponding auxiliary means such as for example blowers can of course be additionally employed. The absorption structure 12 is to be selected with suitable permeability, suitable strength and suitable size. Such structures are for example very inexpensively available in a robust cardboard design protected against decomposition and are for example nowadays used in the evaporative cooling of henhouses.

In the further description of the embodiment, the straight lines provided with arrows represent liquid lines such as for example pipes or hoses, in which the liquids used in the device flow in arrow direction. The pumping devices required thereto are known to the expert and illustrated only in one design variant in the FIGURE.

They are the conveying device or the pump 48 for conveying the absorption agent 18 diluted by the absorbed water to a first heat exchanger 20. One recognizes that the first heat exchanger 20 is connected to a desorption device 30 via a line system 54 in liquid conducting manner such that water 42 desorbed in the desorption device 30 is cooled by means of the diluted absorption agent 18. In addition, first heating of the diluted absorption agent 18 is effected via the first heat exchanger 20 since the desorbed water 42 coming from the desorption device 30 has a higher temperature than the diluted absorption agent 18.

In the illustrated embodiment, the diluted absorption agent 18 is supplied to a further heat exchanger 24 after the first heat exchanger 20. The heat exchanger 24 serves for heat recovery of the heat of a concentrated absorption agent 38, which is returned or supplied from the desorption device 30 to the heat exchanger 24 via a line system 52. Therein, the concentrated absorption agent 38 has a higher temperature than the diluted absorption agent 18 coming from the first heat exchanger 20. The concentrated absorption agent 38 flowing off from the desorption device 30 is then again supplied to the upper area of the absorption structure 12 after the heat exchanger 24 in flow direction. This is again effected via the line system 52.

In the further course, the diluted absorption agent 18 is supplied to a second heat exchanger 22, where it is heated by a heat transfer liquid of a heating device, namely a solar module 26 and a corresponding hose system 28 of the solar module 26. The now thus heated liquid absorption agent 36 is then starting from the second heat exchanger 22 transferred into a housing 46 of the desorption device 30 via a line system 56. One recognizes that the heated, diluted absorption agent 36 is supplied to an evaporation structure 32, which is formed within the desorption device 30, and soaks it. The evaporation structure 32 is again honeycombed formed. A part of the heated, diluted absorption agent 36 evaporates with formation of water vapor at the evaporation structure 32. The water vapor, which is released by the heated, diluted absorption agent 36, is carried along by a regeneration airflow 40 and subsequently brought into contact with a condensation structure 34 soaked with water within the housing 46. The condensation structure 34 serves for condensing the water evaporated with the aid of the evaporation structure 32. One recognizes that the condensation structure 34 is also honeycombed formed to form a surface as large as possible. In an advantageous configuration of the desorption device 30, the evaporation structure 32 and the condensation structure 34 are spatially arranged very close to each other, for example parallel to each other, whereby the transport of the water vapor can occur via the regeneration airflow 40 from the evaporation structure 32 to the condensation structure 34 for example by natural diffusion and/or natural convection. Thus, an additional blower can optionally be omitted, which entails savings in the electricity consumption and in the plant cost. The regeneration air 40 always remains completely within the housing 46. Therein, the temperature of the heated, diluted saline 36 is to be selected such that the partial pressure of the water vapor in the regeneration air 40 exceeds the saturation pressure at ambient temperature.

Since the water, with which the condensation structure 34 is soaked, has a temperature slightly above the ambient temperature and thus a considerably lower temperature than the heated, diluted saline 36, the water vapor condensates from the regeneration air 40 within the condensation structure 34 and thus serves for obtaining water from the ambient air 14. One recognizes that the heat again released in the condensation of the water vapor is transferred out of the condensation structure 34 via the desorbed water 42 and delivered to the diluted absorption agent 18 by means of the first heat exchanger 20. Thereby, a large and expensive air/air heat exchanger can be omitted. Additional cooling devices or for example blowers for cooling can also be omitted, which again entails savings in the electricity consumption and in the plant cost.

Furthermore, one recognizes that the absorption agent 38 again concentrated by the partial evaporation of the water on the evaporation structure 32 is discharged out of the housing 46 of the desorption device 30 via the line system 52 and is again delivered to the absorption structure 12 via the third heat exchanger 24. Thus, the process cycle can be readily repeated.

Furthermore, it becomes clear from the FIGURE that at least a part of the desorbed water 42 is again delivered to an upper area of the condensation structure 34 in the desorption device 30 via a line system 50 according to the illustrated embodiment. Since the desorbed water 42 has been cooled by the first heat exchanger 20, this cooled desorbed water is denoted by 44.

In the above description of the embodiment, for the sake of convenience, it is represented such that the complete mass flow of the absorption agent 16, 18, 36, 38 or of the water flows through the complete circuit. The system can be thus operated and will achieve the represented result. However, it is clear to an expert that possibly for optimizing the heat flows and depending on absorption rates and evaporation rates, not the complete mass flow, but only a part of the absorption agent 16, 18, 36, 38 or of the water has to flow through the complete circuit. Another part of the absorption agent 16, 18 can be conveyed for example from the lower to the upper area of the absorption structure 12 by means of a separate pump. Similarly, a part of the heated, diluted absorption agent 36 can be conveyed from a lower to an upper area of the evaporation structure 32 and therein possibly partially flow through the second heat exchanger 22 for absorbing further heat. And a part of the desorbed water 42 can be conveyed from a lower to an upper area of the condensation structure 34. All of the above mentioned mass flows or partial flows can also at least partially be passed past the second and/or third heat exchanger 22, 24 instead of through them. The volume flows of the cold and the warm absorption agent, respectively, (e.g. by suitable pumping powers) and the volume flows of the airflows (e.g. by a suitable permeability of the honeycomb structures) can also be adapted. The present invention explicitly includes such possible combinations and variants for optimizing the overall system with regard to the yield of water and/or to the energy consumption and/or to the plant cost.

In order to produce drinking water from the desorbed water 42, a filter and disinfection process and a mineralization process, respectively, optionally also have to be installed downstream. These processes correspond to the prior art. It is pointed out that the concentrated absorption agents and salines, respectively, proposed in the present invention already have a highly disinfecting effect. For the sake of convenience, the mineralization of the water obtained from the air could occur in that the water is passed through a gravel bed.

In the following, further embodiments of the device 10 for obtaining water from the ambient air 14 not shown in the FIGURE are described.

Therein, the heated, diluted absorption agent 36 can for example be again heated multiple times within or outside of the desorption device 30 in that it is again passed through one or more heat exchangers after it has flown over/through the evaporation structure 32. The heat exchanger(s) can be arranged within or outside of the housing 46 of the desorption device 30. One/multiple elements for heating the absorption agent 36 can also be attached within the housing 46, which are for example passed by the heat transfer liquid of the solar modules 26. The evaporation process can thus be greatly assisted. In a further exemplary embodiment, the elements for heating the absorption agent 36 can be large-surface configured such that the absorption agent 36, which flows over these elements, immediately evaporates on the surface thereof.

Furthermore, there is the possibility that a reduced pressure exists within the housing 46 of the desorption device 30 in that the air is completely or partially removed. This can for example be achieved by means of a vacuum pump or also in that the water within the housing 46 is brought to the boil by heating by an additional heating element and the water vapor can exit the housing 46 via a valve. Therein, the air contained in the housing 46 is carried along by the water vapor through the valve and removed from the housing 46. When the heating element is turned off thereupon, the water in the housing 46 again cools down and only the vapor pressure of the water vapor exists within the housing 46 thereafter. By the reduced pressure, the transport of water vapor from the evaporation structure 32 to the condensation structure 34 can now be greatly accelerated. If the gas within the housing 46 contains (almost) no air, but only water vapor, a diffusion or convection is no longer required, but the water vapor can directly flow from the evaporation structure 32 to the condensation structure 34.

At this place, it is to be clarified that the term "water vapor" describes the gaseous aggregate state of water and not a mixture of air and water droplets.

The invention claimed is:

1. A device for obtaining water from ambient air comprising:
    at least one device configured for at least one of applying a liquid absorption agent onto a first absorption structure and conducting the liquid absorption agent to the first absorption structure, wherein the first absorption structure is formed for absorbing at least a part of the water contained in the ambient air;
    at least one conveying device for conveying an absorption agent diluted by the absorbed water to a first heat exchanger; and
    at least one desorption device,
    wherein the first heat exchanger is connected to the desorption device in a liquid conducting manner such that water desorbed in the desorption device is cooled by means of the diluted absorption agent,
    wherein at least one evaporation structure is formed in the desorption device, and wherein at least a part of the water of a heated and diluted absorption agent supplied to the desorption device evaporates at and in the evaporation structure, or at least a part of the water of a heated and diluted absorption agent supplied to the desorption device evaporates at or in the evaporation structure,
    wherein at least one condensation structure soaked with water for condensation of the water evaporated by means of the evaporation structure is formed in the desorption device, and
    wherein the device includes at least one line system, wherein the line system is formed such that the at least one condensation structure is at least partially soaked with desorbed water cooled by the first heat exchanger.

2. The device according to claim 1, wherein the liquid absorption agent is a hygroscopic saline.

3. The device according to claim 1, wherein the desorption device includes means for transporting the water evaporated by means of the evaporation structure to the condensation structure.

4. The device according to claim 1, wherein the device includes means for generating a negative pressure in the desorption device.

5. The device according to claim 1, wherein the device includes at least one device for removing the desorbed water from a system circuit.

6. The device according to claim 1, wherein the line system is formed such that concentrated absorption agent flowing off from the desorption device is supplied to the first absorption structure with or without interposition of a third heat exchanger.

7. The device according to claim 6, wherein the third heat exchanger is arranged after the first heat exchanger in a flow direction of the diluted absorption agent, wherein heating of the diluted absorption agent is effected by the third heat exchanger before entry into the desorption device.

8. The device according to claim 1, wherein the device includes at least one heating device for heating the diluted absorption agent, and wherein the heating device(s) is/are arranged before, after, outside of, or within the desorption device.

9. The device according to claim 8, wherein the heating device includes at least one second heat exchanger arranged between the first heat exchanger and the desorption device, and wherein the second heat exchanger is connected to the first heat exchanger in a liquid conducting manner on the one hand and to the desorption device in a liquid conducting manner on the other hand.

10. The device according to claim 9, wherein the heating device(s) include(s) heat exchangers, solar modules or line systems for heat transfer liquids.

11. The device according to claim 9, wherein the heating devices include at least one of a heat exchanger, a solar module and a line system for heat transfer liquids.

12. The device according to claim 9, wherein the second heat exchanger is in operative connection to at least one heating device.

13. The device according to claim 9, wherein the at least one heating device in operative connection to the second heat exchanger includes at least one solar module and at least one hose system with a heat transfer liquid.

14. The device according to claim 12, wherein the at least one heating device in operative connection to the second heat exchanger includes at least one solar module or at least one hose system with a heat transfer liquid.

* * * * *